US010733437B2

(12) United States Patent
Weller et al.

(10) Patent No.: US 10,733,437 B2
(45) Date of Patent: Aug. 4, 2020

(54) DISPLAY ASSEMBLY INCORPORATING AN IMAGE SENSOR (71) Applicant: Gentex Corporation, Zeeland, MI (US)

(72) Inventors: Andrew D. Weller, Holland, MI (US); Ethan J. Lee, Byron Center, MI (US); John A. VanderPloeg, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/918,600

(22) Filed: Mar. 12, 2018

(65) Prior Publication Data

US 2018/0276466 A1 Sep. 27, 2018

Related U.S. Application Data (60) Provisional application No. 62/474,958, filed on Mar. 22, 2017.

(51) Int. Cl.
*H04N 5/00* (2011.01)
*G06K 9/00* (2006.01)
*H04N 9/04* (2006.01)
*H04N 5/225* (2006.01)
*B60R 1/04* (2006.01)
(Continued)

(52) U.S. Cl.
CPC ........... *G06K 9/00604* (2013.01); *B60R 1/04* (2013.01); *B60R 1/12* (2013.01); *G09G 3/3413* (2013.01); *H04N 5/2254* (2013.01); *H04N 5/2256* (2013.01); *H04N 5/2257* (2013.01); *H04N 9/04* (2013.01); *B60R 2001/1253* (2013.01); *B60R 2300/103* (2013.01); *B60R 2300/8046* (2013.01); *B60R 2300/8066* (2013.01); *H04N 5/33* (2013.01)

(58) Field of Classification Search
CPC .......... G02F 1/157; G02F 1/1335; G02F 1/19; G02B 27/01; G02B 11/14; H04N 5/235
See application file for complete search history.

(56) References Cited

U.S. PATENT DOCUMENTS 5,928,572 A 7/1999 Tonar et al.
5,998,617 A 12/1999 Srinivasa et al.
(Continued)

FOREIGN PATENT DOCUMENTS

| CN | 104802709 A | 7/2015 |
| WO | 9842796 A1 | 10/1998 |
| WO | 9902621 A1 | 1/1999 |

OTHER PUBLICATIONS

U.S. Appl. No. 61/704,869, filed Sep. 24, 2012, entitled Image Manipulation for Automotive Rearview Device.
(Continued)

*Primary Examiner* — Frank F Huang
(74) *Attorney, Agent, or Firm* — Price Heneveld LLP; Bradley D. Johnson (57) ABSTRACT

A vehicle display device is disclosed. The device comprises an image sensor comprising an imager configured to capture image data and a display. The display comprises a plurality of display elements forming a display surface. The display surface forms a display perimeter. The display elements surround the image sensor on the display surface such that the image sensor is disposed within the display perimeter.

18 Claims, 7 Drawing Sheets

(51) Int. Cl.
    *G09G 3/34*     (2006.01)
    *B60R 1/12*     (2006.01)
    *H04N 5/33*     (2006.01)

(56) References Cited

U.S. PATENT DOCUMENTS

| | | | |
|---|---|---|---|
| 6,020,987 | A | 2/2000 | Baumann et al. |
| 6,037,471 | A | 3/2000 | Srinivasa et al. |
| 6,137,620 | A | 10/2000 | Guarr et al. |
| 6,141,137 | A | 10/2000 | Byker et al. |
| 6,193,912 | B1 | 2/2001 | Thieste et al. |
| 6,241,916 | B1 | 6/2001 | Claussen et al. |
| 6,249,369 | B1 | 6/2001 | Theiste et al. |
| 6,519,072 | B2 | 2/2003 | Nishikitani et al. |
| 6,572,233 | B1 | 6/2003 | Northman et al. |
| 8,201,800 | B2 | 6/2012 | Filipiak |
| 8,210,695 | B2 | 7/2012 | Roth et al. |
| 8,237,909 | B2 | 8/2012 | Ostreko et al. |
| 8,264,761 | B2 | 9/2012 | Cammenga et al. |
| 8,339,526 | B2 | 12/2012 | Minikey, Jr. et al. |
| 8,411,245 | B2 | 4/2013 | Lee et al. |
| 8,643,931 | B2 | 2/2014 | Cammenga et al. |
| 8,646,924 | B2 | 2/2014 | Roth et al. |
| 8,814,373 | B2 | 8/2014 | Steel et al. |
| 8,827,517 | B2 | 9/2014 | Cammenga et al. |
| 8,885,240 | B2 | 11/2014 | Roth et al. |
| 8,925,891 | B2 | 1/2015 | Van Huis et al. |
| 8,960,629 | B2 | 2/2015 | Rizk et al. |
| 9,174,577 | B2 | 11/2015 | Busscher et al. |
| 9,244,249 | B2 | 1/2016 | Kim et al. |
| 9,316,347 | B2 | 4/2016 | Roth |
| 9,838,653 | B2 | 12/2017 | Fish, Jr. et al. |
| 10,347,179 | B2 * | 7/2019 | Kim ............... G09G 3/3233 |
| 2003/0030745 | A1 | 2/2003 | Meek et al. |
| 2010/0046059 | A1 * | 2/2010 | McCabe ............... B60R 1/12 |
| | | | 359/267 |
| 2014/0118591 | A1 | 5/2014 | Maglaque |
| 2015/0181099 | A1 * | 6/2015 | Van Der Tempel ............... |
| | | | G01S 17/023 |
| | | | 348/135 |
| 2016/0358582 | A1 | 12/2016 | Lee et al. |

OTHER PUBLICATIONS

U.S. Appl. No. 61/707,625, filed Sep. 28, 2012, entitled Integrated Spotter in Interior Electrochromic Mirror.

Federal Institute of Industrial Property, "Notification of Transmittal of the International Search Report and the Written Opinion of the International Searching Authority," dated Jun. 21, 2018 (9 pages).

\* cited by examiner

DISPLAY ASSEMBLY INCORPORATING AN IMAGE SENSOR

CROSS-REFERENCE TO RELATED APPLICATION

This application claims priority to and the benefit under 35 U.S.C. § 119(e) of U.S. Provisional Patent Application No. 62/474,958, filed on Mar. 22, 2017, entitled "DISPLAY ASSEMBLY INCORPORATING AN IMAGE SENSOR," the entire disclosure of which is hereby incorporated herein by reference.

TECHNOLOGICAL FIELD

The present invention generally relates to a video display, and, more particularly, to a video display comprising an image sensor incorporated within a display area.

SUMMARY OF THE DISCLOSURE

According to one aspect of the present disclosure, a display apparatus for a vehicle is disclosed. The apparatus comprises a display element comprising a plurality of display elements. The display elements form a display surface having a display perimeter disposed in a housing and configured to display image data in a display emission. The apparatus further comprises an electrochromic element abutting the display element. The electrochromic element is configured to selectively transmit the display emission therethrough. An imager module is disposed on the display surface and comprises an image sensor and a light source. The image sensor is configured to capture image data in a field of view directed through the electrochromic element. The light source is configured to transmit an emission through the electrochromic element. The image sensor is configured to capture image data comprising reflected light from the emission through the electrochromic element. The display elements surround the imager module on the display surface such that the image sensor is disposed within the display perimeter.

According to another aspect of the present disclosure, a display apparatus for a vehicle is disclosed. The apparatus comprises a display device comprising a plurality of display elements forming a display surface. The display surface has a display perimeter disposed in a housing and is configured to display image data in a display emission. An electrochromic element abuts the display device and is configured to selectively transmit the display emission therethrough. The apparatus further comprises an image sensor configured to capture image data. The image data comprises an object in a field of view directed through the electrochromic element. The display elements of the display device surround the image sensor on the display surface such that the image sensor is disposed within the display perimeter.

According to yet another aspect of the present disclosure, a vehicle display device is disclosed. The device comprises an image sensor comprising an imager configured to capture image data and a display. The display comprises a plurality of display elements forming a display surface. The display surface forms a display perimeter. The display elements surround the image sensor on the display surface such that the image sensor is disposed within the display perimeter.

These and other features, advantages, and objects of the present invention will be further understood and appreciated by those skilled in the art by reference to the following specification, claims, and appended drawings.

DETAILED DESCRIPTION

Figure 1:
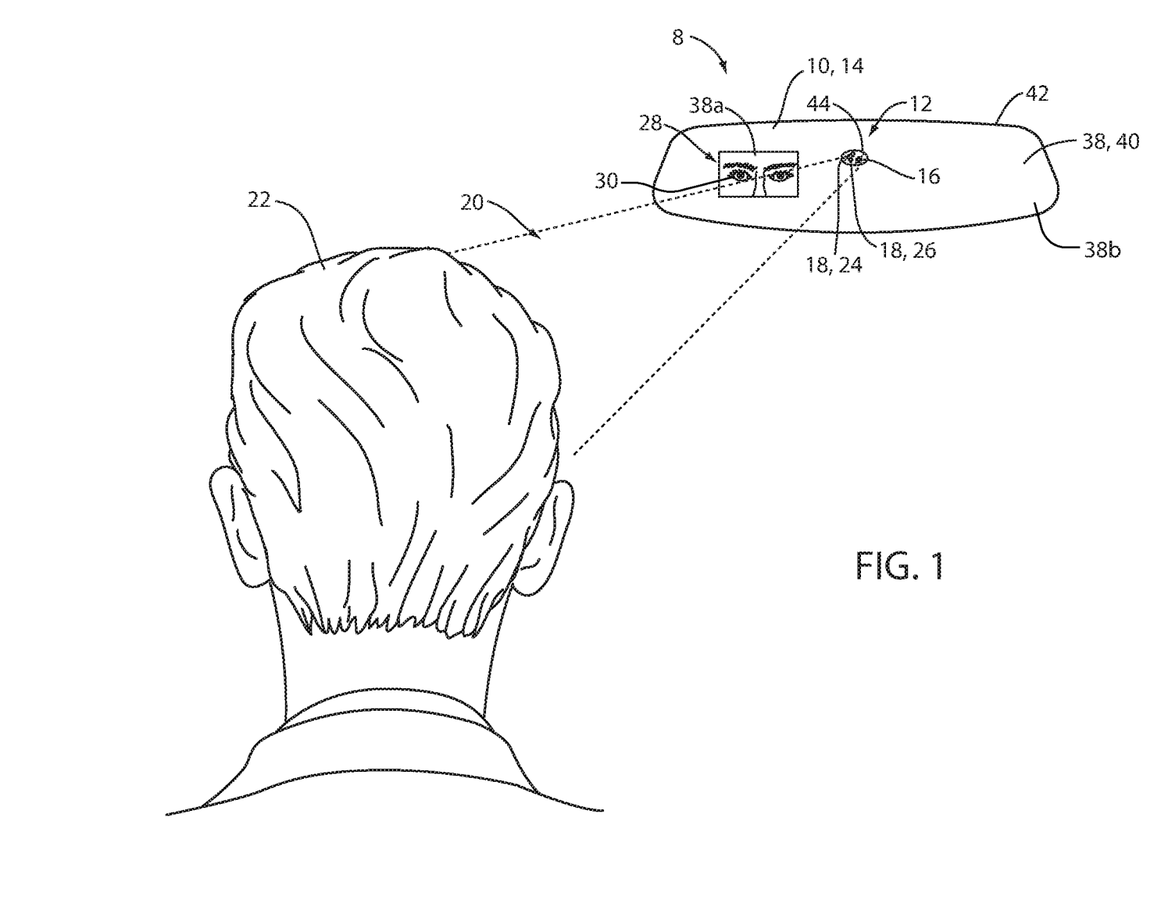
FIG. 1 is an illustrative view of a rearview display assembly comprising an image sensor.

For purposes of description herein, the terms "upper," "lower," "right," "left," "rear," "front," "vertical," "horizontal," and derivatives thereof shall relate to the invention as oriented in FIG. 1. Unless stated otherwise, the term "front" shall refer to the surface of the element closer to an intended viewer of the mirror element, and the term "rear" shall refer to the surface of the element further from the intended viewer of the mirror element. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 2:
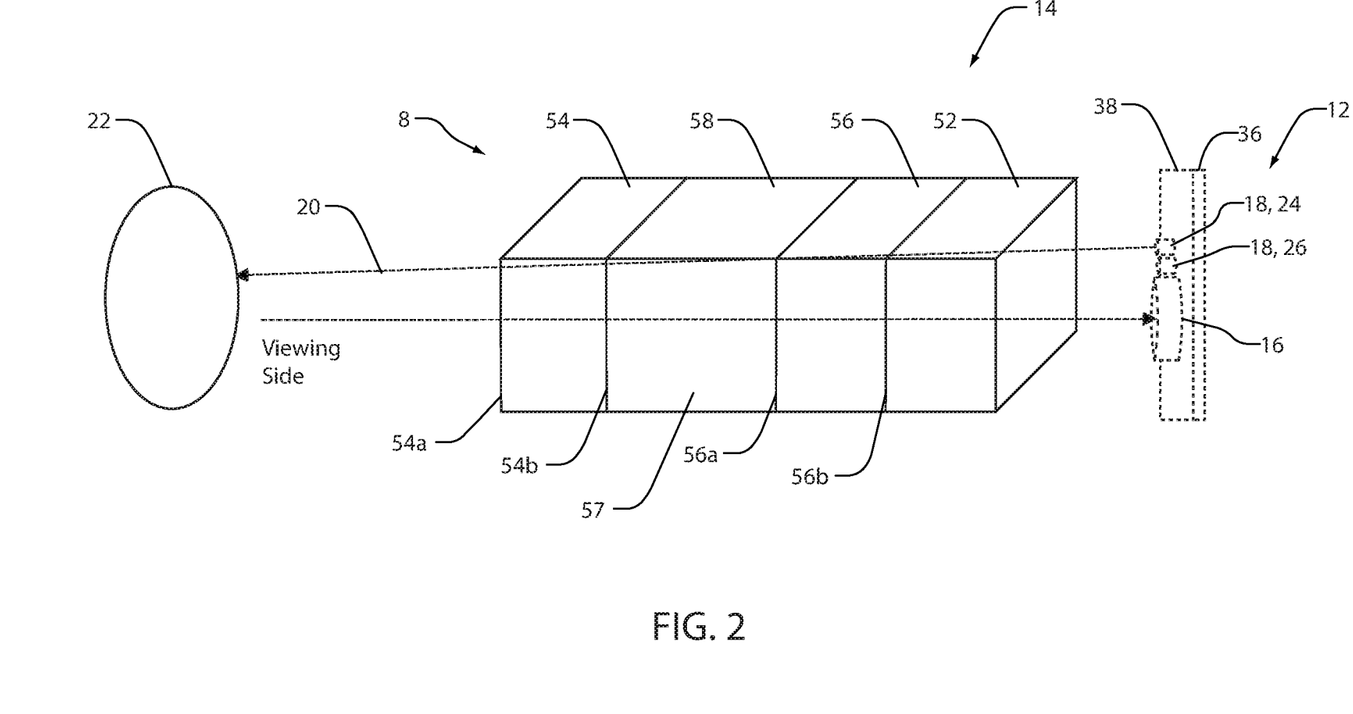
FIG. 2 is a schematic, cross-sectional view of the rearview display assembly of FIG. 1.

Referring to FIGS. 1 and 2 in some embodiments, the disclosure provides for a rearview display assembly 8 comprising a display device 10. The display device 10 as shown is configured to present a rearward directed view from a vehicle. The display device 10 may comprise an imaging device 12 or imaging module incorporated in an interior rearview display assembly 8 for an automotive vehicle. The display assembly 8 may correspond to an electro-optic assembly 14 having an electrochromic (EC) mirror element. The image sensor may be configured to capture image data utilized in an identification function. For example, the image data may correspond to biometric data (e.g. an image of an iris) configured to be processed in an iris scan identification function. In this configuration, the imaging device 12 may provide for an interior rearview display assembly 8 configured to capture image data that may be utilized to identify a subject (e.g. an operator of a vehicle) based on the iris scan identification function.

The iris scan identification function may utilize an infrared illumination of an iris of an eye in order to illuminate the eye for the identification. Such illumination may be optimized in conditions allowing for a high optical transmittance in the near-infrared (NIR) range. In some embodiments, the disclosure may provide for an electrochromic (EC) stack of the electro-optic assembly 14 that may have a high light transmittance in the NIR range, for example, wavelengths of light ranging from 800 nm to 940 nm. Additionally, in some implementations, the electro-optic assembly 14 may comprise a plurality of light sources configured to illuminate at least one iris of the operator 22 of the vehicle.

To provide for the iris scan identification function, an image sensor 16 may be disposed proximate a rear surface of the electro-optic assembly 14. The image sensor 16 may correspond to, for example, a digital charge-coupled device (CCD) or complementary metal-oxide-semiconductor (CMOS) active pixel sensor, although may not be limited to these exemplary devices. The image sensor 16 may be in communication with at least one light source 18, which may correspond to one or more emitters configured to output an emission 20 of light in the NIR range. In this configuration, the image sensor 16 may be configured to selectively activate the one or more infrared emitters corresponding to the at least one light source 18 to illuminate the iris such that an identity of an operator 22 of the vehicle may be determined.

The infrared emitters or the light sources 18 may correspond to a plurality of emitter banks configured to emit light in the visible range, infrared range, or the near infrared range. Each of the emitter banks may comprise one or more light sources, which may be in the form of light emitting diodes. In an exemplary embodiment, the light sources 18 may correspond to a first emitter 24 and a second emitter 26. The first emitter 24 and the second emitter 26 may be configured to output the emission 20 in the NIR range. In this configuration, the imaging device 12 may be configured to illuminate the eyes 30 of the operator 22 such that the image sensor 16 may capture image data including details of the irises of the eyes 30.

In operation, image data captured by the image sensor 16 may be displayed on the display apparatus 10 providing visual feedback to the operator 22, which may assist in an aiming operation relating to the capture of the image data. For example, during an iris scan identification function, the display apparatus 10 may be configured to demonstrate a preview image 28 demonstrating the eyes 30 of the operator 22 on a first portion 38a of a display 38. A remaining second portion 38b of the display 38 may be utilized to display image data captured by one or more additional image sensors (e.g. a reverse camera, security camera, etc.). In this way, the display apparatus 10 may utilize the image sensor 16 in combination with the display screen to demonstrate various forms of image data. Though the first portion 38a and the second portion 38b of the display are shown in particular positions and proportions, the display 38 may be proportioned in a variety of ways to suit a desired operation of the apparatus 10.

The image sensor 16 may be disposed on a circuit 36, for example, a printed circuit board in communication with a controller. The controller may further be in communication with various devices that may be incorporated in the vehicle via the communication bus or any other suitable communication interface. The controller may correspond to one or more processors or circuits, which may be configured to process image data received from the image sensor 16. In this configuration, the image data may be communicated from the image sensor 16 to the controller. The controller may process the image data with one or more algorithms configured to determine an identity of the operator 22 of the vehicle. Further detailed discussion of the controller and the various devices that may be in communication therewith are discussed in reference to FIG. 7.

The controller may further be in communication with the display 38. The display 38 may comprise a display surface 40, which may correspond to a viewing area of the display 38. The display surface 40 may extend to a display perimeter 42 of the display assembly 8. In this configuration, the display surface 40 may partially or completely enclose a sensor perimeter 44 of the image sensor 16. In some embodiments, the display surface 40 may also partially or completely enclose the one or more light sources 18. In order to accommodate, the area within the sensor perimeter 44, an opening may be formed within a plurality of display elements forming the display surface 40. The opening may correspond to a space or gap in the display elements providing a portion of the display surface 40 to enclose about the sensor perimeter 44 of the image sensor 16 and/or the one or more light sources 18. In this configuration, the image sensor 16 and/or the one or more light sources 18 may be integrated within the display surface 40.

Figure 4:
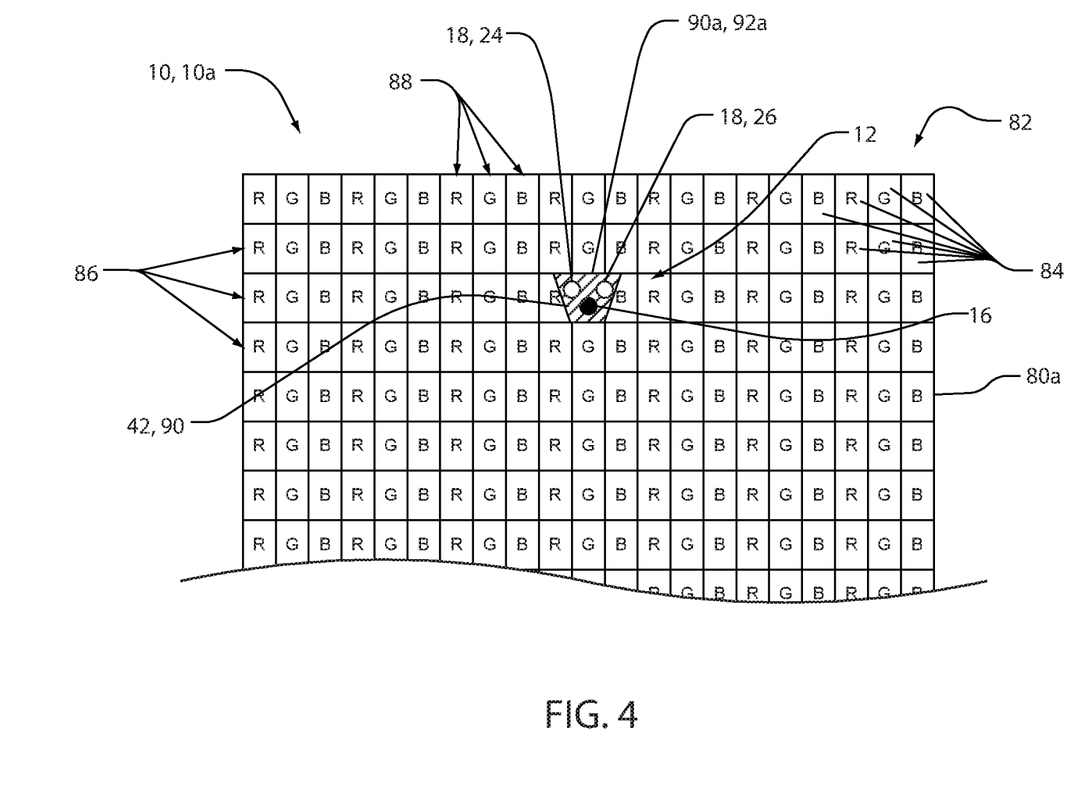
FIG. 4 is a detailed view of an exemplary embodiment of a pixel array comprising an image sensor incorporated therein.
Figure 5:
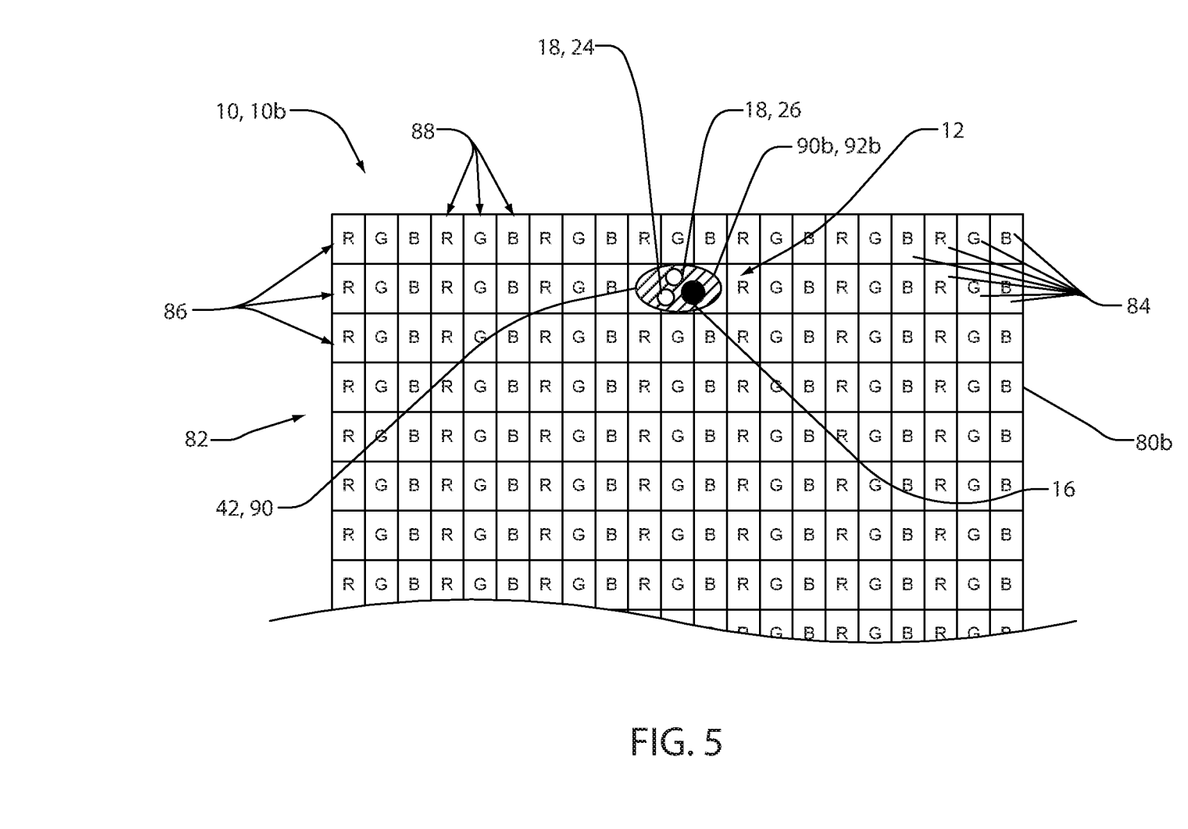
FIG. 5 is a detailed view of an exemplary embodiment of a pixel array comprising an image sensor incorporated therein.

Further details regarding exemplary embodiments of the plurality of display elements forming the display surface 40 are discussed further in reference to FIGS. 4 and 5. As illustrated in FIG. 1, the sensor perimeter 44 may not be shown to scale to demonstrate detail. In an exemplary embodiment, the sensor perimeter 44 may be significantly smaller than that illustrated in FIG. 1 such that the sensor perimeter 44 is not significantly visible on the display surface 40. In this way, image data (e.g. image data demonstrating a rearward directed field of view from the vehicle) may be displayed on the display surface 40 without the image sensor 16 causing a significant visual distraction. For example, in some embodiments, the sensor perimeter 44 may replace a small number of display elements or pixels of the display 38.

The display 38 may correspond to a partial or full display and may correspond to a display mirror configured to display an image data through at least a portion of the display assembly 8. The display 38 may be constructed utilizing various technologies, for example, LCD, LED, OLED, plasma, digital light projection (DLP), or other display technology. Examples of display assemblies that may be utilized with the disclosure may include U.S. Pat. No. 6,572,233 entitled "Rearview display mirror," U.S. Pat. No. 8,237,909 entitled "Vehicular rearview display assembly including integrated backlighting for a liquid crystal display (LCD)," U.S. Pat. No. 8,411,245 entitled "Multi-display mirror system and method for expanded view around a vehicle," and U.S. Pat. No. 8,339,526 entitled "Vehicle rearview display assembly including a high intensity display," which are incorporated herein by reference in their entirety.

The various components of the electro-optic assembly 14 and the imaging device 12 may be contained within a housing 44 of the display assembly 8. In this way, the various components discussed herein may be substantially hidden from a view of the operator 22. Accordingly, the disclosure may provide for various advanced functions from the electro-optic assembly 14 and the imaging device 12 while maintaining an appearance of a conventional rearview mirror.

Referring to FIG. 2, a cross-sectional view of the electro-optic assembly 14 is shown. The electro-optic assembly 14 may be controlled to be reflective or transmissive and comprise a mirror element 52. The mirror element 52 may include a first substrate 54 having a first surface 54a and a second surface 54b. The mirror element 52 may further comprise a second substrate 56 having a third surface 56a and a fourth surface 56b. The first substrate 54 and the second substrate 56 may define a cavity 57 and may be substantially parallel. The first surface 54a and the third surface 56a may be oriented toward a front surface of the display assembly 8. The second surface 54b and the fourth surface 56b may be oriented toward a rear surface of the display assembly 8 or the housing 44 of the display assembly 8.

In some embodiments, the image sensor 16 and the one or more light sources 18 may be disposed behind the electro-optic assembly 14. In the various embodiments, the one or more light sources 18 may be configured to project the emission 20 of light in the NIR range such that the image sensor 16 may receive light reflected from a subject of the imaging device 12 (e.g. a passenger or operator). Accordingly, the imaging device 12 may be utilized to suit a variety of applications without departing from the spirit of the disclosure.

The cavity 57 may contain an electro-optic medium 58, such as, but not limited to, an electrochromic medium. The cavity 57 may be completely or partially filled with the medium 58. The display assembly 8 may be in communication with a dimming controller via electrical contacts and may comprise various seals to retain the medium 58 in the cavity 57. In this configuration, the display assembly 8 may correspond to an electrochromic mirror element configured to vary in reflectivity in response to a control signal received from the dimming controller via the electrical contacts. The control signal may change an electrical potential supplied to the display assembly 8 to control the reflectivity. Accordingly, in some embodiments, the display device 10 may be configured to present a rearward directed view as a reflection from the mirror element 52 and may further be operable to display the image data demonstrating a rearward directed field of view from the vehicle on the display surface 40.

Figure 3:
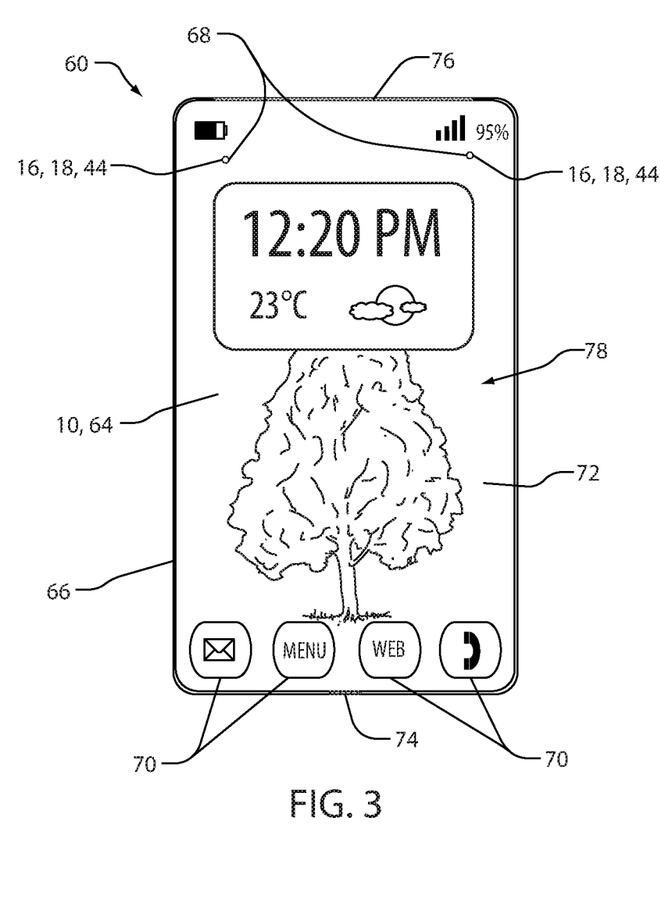
FIG. 3 is a front view of a mobile device comprising an image sensor.

Referring now to FIG. 3, an exemplary embodiment of a mobile device 60 is shown. In some embodiments, the mobile device 60 may comprise the display 38 similar to the rearview assembly 8. The mobile device 60 may correspond to a portable computer, smartphone, personal data assistant (PDA), cellular telephone, or a variety of electronic devices. The display device 10 of the mobile device 60 may comprise various similarities to the display device 10. Accordingly, like reference numerals are used to describe like or similar elements of the display device 10 and the mobile device 60 for clarity.

For example, the display 38 of the mobile device 60 may form a display surface 64. The display surface 64 may correspond to a viewing area configured to display image data generated by the mobile device 60. Additionally, the mobile device 60 may comprise the image sensor 16 and/or the one or more light sources 18 disposed within the sensor perimeter 44. The sensor perimeter 44 may be formed as an opening within a plurality of display elements of the display surface 64. In this configuration, the mobile device 60 may incorporate the image sensor 16 and/or the one or more light sources 18 within a display perimeter 66 formed by the display surface 64.

The display surface 64 may extend to the display perimeter 66 of the mobile device 60. In this configuration, the display surface 64 may partially or completely enclose the sensor perimeter 44 of the image sensor 16. The display surface 64 may also partially or completely enclose the one or more light sources 18. As discussed further in reference to FIGS. 4 and 5, the sensor perimeter 44 may form an opening within a plurality of display elements forming the display surface 40. The opening may correspond to a space or gap in the display elements providing a portion of the display surface 40 to enclose about the sensor perimeter 44 of the image sensor 16 and/or the one or more light sources 18. In this configuration, the image sensor 16 and/or the one or more light sources 18 may be integrated within the display surface 64.

Figure 7:
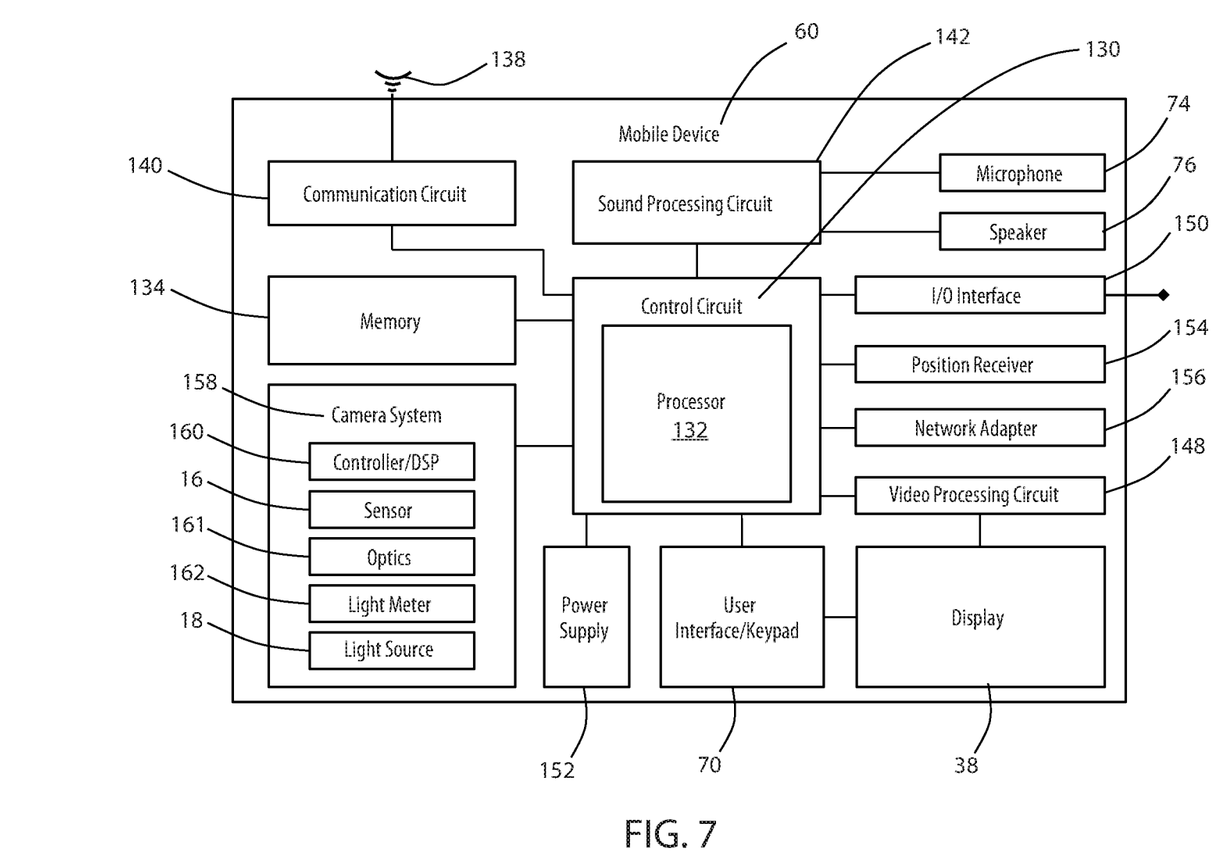
FIG. 7 is a block diagram of a mobile device comprising an image sensor in accordance with the disclosure.

As discussed further in reference to FIG. 7, the mobile device 60 may comprise one or more circuits, processors, memory, and a variety of interface devices that may provide a variety of functions. For example, the mobile device may comprise a user interface 70, which may correspond to a touch screen 72. The touch screen 72 may be implemented using a variety of technologies, including, but not limited to, capacitive, resistive, surface acoustic wave, infrared, etc. The mobile device 60 may further comprise at least one microphone 74 and a speaker 76, which may be utilized to facilitate the detection and audio broadcast of audio data from the mobile device 60. The microphone 74 and the speaker 76 may be disposed along or outside the display perimeter 66 of the display surface 64. In this configuration, the display device 10 may extend to the extremities of a front surface 78 of the mobile device 60. Also, as disclosed herein, the functionality of the front-facing camera 68 may be incorporated within the display surface 64 allowing the display surface 64 to extend to the extremities of the front surface 78 of the mobile device 60.

Referring now to FIGS. 4 and 5 a first exemplary display device 10a and a second exemplary display device 10b are discussed in accordance with the disclosure. Each of the devices 10a and 10b may be implemented to form the rearview assembly 8 or the mobile device 60 as discussed in reference to FIGS. 1 and 3. For clarity, the display devices 10a and 10b may generally be referred to as the display device 10 to describe common features and discussed as the first display 80a and the second display 80b in reference to differing features. However, it shall be understood that the various properties of the first display 80a and the second display 80b may be utilized in various combinations without departing from the spirit of the disclosure.

The display device 10 may comprise the plurality of display elements in the form of a pixel array 82. The pixel array 82 may comprise a plurality of pixels 84 arranged in rows 86 and columns 88 forming a contiguous display region. The pixel array 82 may extend to the display perimeter (e.g. the sensor perimeter 44, the display perimeter 66) such that light forming image data may be emitted across the display surface 40, 64. The pixels 84 may commonly comprise red pixels R, green pixels G, and blue pixels B as shown. However, in some embodiments, the pixels may also include white pixels or pixels of other colors without departing from the spirit of the disclosure.

As discussed herein, the pixel array 82 may partially or completely enclose the sensor perimeter 44 of the image sensor 16. In some embodiments, the display surface 40 may also partially or completely enclose the one or more light sources 18. In order to accommodate the area within the sensor perimeter 44, an opening 90 may be formed by a plurality of pixels 84 on the display surface 40, 64. The opening 90 may correspond to a space or gap in the display elements providing a portion of the display surface 40 to enclose about the sensor perimeter 44 of the image sensor 16 and/or the one or more light sources 18. In this configuration, the image sensor 16 and/or the one or more light sources 18 may be integrated within the display surface 40, 64.

As demonstrated, the opening 90 may be formed by omitting one or more of the pixels 84 from the pixel array 82. The specific number of pixels may vary based on the size of the image sensor 16 and/or the light sources 18. In this configuration, only a small portion of the image data may be interrupted or missing corresponding to the pixels 84 omitted or removed to form the opening 90. The image data may be displayed without the pixels 84 in the sensor perimeter 44 and the sensor perimeter 44 may be surrounded by one or more rows or columns of the pixels 84. Based on the small surface area of the sensor perimeter 44, the omission of the pixels 84 may not cause a significant visual distraction and provide for the display surface 40, 64 to extend to the sensor perimeter 44 or display perimeter 66 of the display device 10.

As discussed herein, the display device 10 may correspond to a partial or full display mirror configured to display an image data through at least a portion of the display assembly 8. The display device 10 may be constructed utilizing various technologies, for example, LCD, LED, OLED, plasma, DLP or other display technology. Examples of display assemblies that may be utilized with the disclosure may include U.S. Pat. No. 6,572,233 entitled "Rearview display mirror," U.S. Pat. No. 8,237,909 entitled "Vehicular rearview display assembly including integrated backlighting for a liquid crystal display (LCD)," U.S. Pat. No. 8,411,245 entitled "Multi-display mirror system and method for expanded view around a vehicle," and U.S. Pat. No. 8,339,526 entitled "Vehicle rearview display assembly including a high intensity display," which are incorporated herein by reference in their entirety.

Referring now to FIG. 4, the first opening 90a for the first display 80a of the first display device 10a may comprise a first perimeter shape 92a. The first perimeter shape 92a may be trapezoidal. For example, the first perimeter shape 92a may be triangular, rectangular or correspond to a variety of geometric shapes. The first perimeter shape 92a may replace or be disposed over one or more of the pixels 84 such that the sensor perimeter 44 is at least partially or completely enclosed by the pixels 84. In this configuration, the display device 10 may be configured to accommodate the sensor perimeter 44 within the display surface 40, 64.

Referring now to FIG. 5, the second opening 90b for the second display 80b of the second display device 10b may comprise a second perimeter shape 92b. The second perimeter shape 92b may be substantially round. For example, the second perimeter shape 92b may be round, oval-shaped, or correspond to one or more geometric shapes having rounded edges. The second perimeter shape 92b may replace or be disposed over one or more of the pixels 84 such that the sensor perimeter 44 may be at least partially or completely enclosed by the pixels 84. Accordingly, the display device 10 may be configured to suit a variety of applications, which may incorporate the sensor perimeter 44 within the display surface 40, 64.

Figure 6:
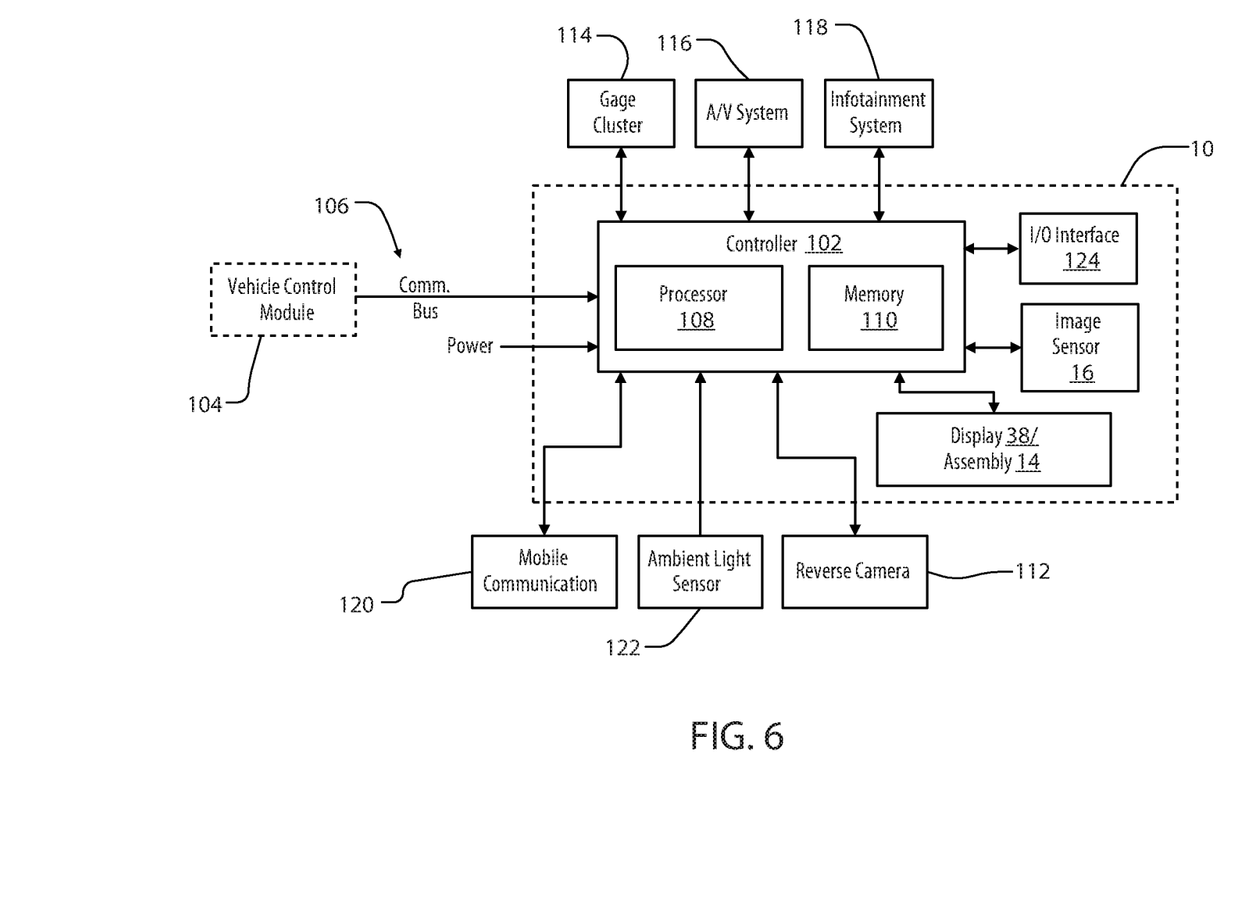
FIG. 6 is a block diagram of rearview display assembly comprising an image sensor.

Referring to FIG. 6, a block diagram of the display assembly 8 incorporating the display device 10 is shown. The display assembly 8 may comprise a controller 102 shown in communication with the display 38 of the display device 10. The controller 102 and may also be in communication with a vehicle control module 104 via a communication bus 106 of the vehicle. The communication bus 106 may be configured to deliver signals to the controller 102 identifying various vehicle states. For example, the communication bus 106 may be configured to communicate to the controller 102 a drive selection of the vehicle, an ignition state, a door open or ajar status, and a remote activation of the display device 10. Such information and control signals may be utilized by the controller 102 to activate or adjust various states and/or control schemes of the display device 10 and/or the display assembly 8.

The controller 102 may comprise a processor 108 having one or more circuits configured to receive the signals from the communication bus 106 and control the display device 10. The processor 108 may be in communication with a memory 110 configured to store instructions to control operations of the display device 10. The controller 102 may further be in communication with a reverse camera 112 or any other form of vehicle camera system. The controller 102 may receive image data from the reverse camera 112 corresponding to a rearward-directed field of view relative to the vehicle. In this configuration, the display device 10 may provide for the rearward-directed field of view to be displayed. The controller 102 may further be in communication with one or more of a gauge cluster 114, an audio/video (A/V) system 116, an infotainment system 118, a media center, a vehicle computing system, and/or various other devices or systems of the vehicle. In various embodiments, the controller 102 may display image data from the image sensor 16 and/or the reverse camera 112.

In an exemplary embodiment, the controller 102 may correspond to one or more processors or circuits. The controller 102 may be configured to process image data received from the image sensor 16. In this configuration, the controller 102 may process the image data with one or more algorithms configured to determine an identity of the operator 22 of the vehicle. With the identity of the operator 22, the controller 102 may further be operable to control various systems or functions of the vehicle.

In some embodiments, the controller 102 may be in communication with a mobile communication system 120. The mobile communication system 120 may be configured to communicate via various mobile communication protocols. Wireless communication protocols may operate in accordance with communication standards including, but not limited to: Institute of Electrical and Electronic Engineering (IEEE) 802.11 (e.g., Wi-Fi™); Bluetooth®; advanced mobile phone services (AMPS); digital AMPS; global system for mobile communications (GSM); code division multiple access (CDMA); Long Term Evolution (LTE or 4G LTE); local multipoint distribution systems (LMDS); multi-channel-multi-point distribution systems (MMDS); RFID; and/or variations thereof.

The controller 102 may further be in communication with an ambient light sensor 122. The ambient light sensor 122 may be operable to communicate a light condition. For example, the ambient light sensor 122 may measure a level of brightness or intensity of the ambient light proximate the vehicle. In response to the level of the ambient light, the controller 102 may be configured to adjust a light intensity output from the display 38. In this configuration, an operator of the vehicle may adjust the brightness of the display to provide image data captured by the image sensor 16 and the reverse camera 112.

The controller 102 may further be in communication with an interface 124 configured to receive one or more inputs configured to control at least one of the display device 10 and the reverse camera 112. In some embodiments, the interface 124 may be combined with one or more devices of the vehicle. For example, the interface 124 may form a portion of the gauge cluster 114, the A/V system 116, the infotainment system 118, a display console and/or various input/output devices that may commonly be utilized in automotive vehicles (e.g. a steering switch, steering wheel controls, etc.). In this way, the disclosure provides for various control schemes for implementing the display device 10 in a vehicle.

The electro-optic assembly 14 may be an electrochromic element or an element, such as a prism. One non-limiting example of an electrochromic element is an electrochromic medium, which includes at least one solvent, at least one anodic material, and at least one cathodic material. Typically, both of the anodic and cathodic materials are electro-active and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference. Electrochromic components, as described herein, include materials whose color or opacity are affected by electric current, such that when an electrical current is applied to the material, the color or opacity change from a first phase to a second phase. The electrochromic component may be a single-layer, single-phase component, multi-layer component, or multi-phase component, as described in U.S. Pat. No. 5,928,572 entitled "Electrochromic Layer And Devices Comprising Same," U.S. Pat. No. 5,998,617 entitled "Electrochromic Compounds," U.S. Pat. No. 6,020,987 entitled "Electrochromic Medium Capable Of Producing A Pre-selected Color," U.S. Pat. No. 6,037,471 entitled "Electrochromic Compounds," U.S. Pat. No. 6,141,137 entitled "Electrochromic Media For Producing A Pre-selected Color," U.S. Pat. No. 6,241,916 entitled "Electrochromic System," U.S. Pat. No. 6,193,912 entitled "Near Infrared-Absorbing Electrochromic Compounds And Devices Comprising Same," U.S. Pat. No. 6,249,369 entitled "Coupled Electrochromic Compounds With Photostable Dication Oxidation States," U.S. Pat. No. 6,137,620 entitled "Electrochromic Media With Concentration Enhanced Stability, Process for the Preparation Thereof and Use In Electrochromic Devices," and U.S. Pat. No. 6,519,072 entitled "Electrochromic Device"; and International Patent Application Publication Nos. WO 98/42796 entitled "Electrochromic Polymeric Solid Films, Manufacturing Electrochromic Devices Using Such Solid Films, and Processes for Making Such Solid Films and Devices," and WO 99/02621 entitled "Electrochromic Polymer System," which are herein incorporated by reference in their entirety.

The present disclosure may be used with a mounting system such as that described in U.S. Pat. Nos. 8,814,373; 8,201,800; 8,210,695; 8,925,891; 8,960,629; 9,174,577; 9,244,249; and 9,838,653; and U.S. Provisional Patent Application No. 61/704,869, which are hereby incorporated herein by reference in their entirety. Further, the present disclosure may be used with a rearview packaging assembly such as that described in U.S. Pat. Nos. 8,814,373; 8,646,924; 8,643,931; 8,264,761; 8,885,240; and 9,316,347; and U.S. Provisional Patent Application No. 61/707,625, which are hereby incorporated herein by reference in their entirety. Additionally, it is contemplated that the present disclosure can include a bezel such as that described in U.S. Pat. Nos. 8,827,517; 8,210,695; and 8,201,800, which are hereby incorporated herein by reference in their entirety.

Referring to FIG. 7, a block diagram of the mobile device 60 is shown. The mobile device 60 may comprise a primary control circuit 130 that is configured to control the functions and operations of the mobile device 60. The control circuit 130 may include a processor 132, such as a CPU, microcontroller or microprocessor. The processor 132 executes code stored in a memory (not shown) within the control circuit 130 and/or in a separate memory, such as the memory 134, in order to carry out various operations of the mobile device 60. The memory 134 may be, for example, one or more of a buffer, a flash memory, a hard drive, a removable media, a volatile memory, a non-volatile memory or other suitable devices.

The mobile device 60 may also include an antenna 138 coupled to a wireless communication circuit 140. The communication circuit 140 includes a radio frequency transmitter and receiver for transmitting and receiving signals via the antenna 138. The radio signals may be configured to transmit data and may correspond to various communications protocols. The communication circuit 140 may be configured to operate in a mobile communications system and may be used to send and receive data and/or audiovisual content. Receiver types for interaction with a mobile radio network and/or wireless broadcast network may include GSM, CDMA, WCDMA, GPRS, MBMS, Wi-Fi, WiMAX, DVB-H, ISDB-T, etc., as well as advanced versions of these standards that may be developed at a later time. In some embodiments, the communication circuit 140 may include one or more receiver types that may provide communication over various ranges that may be configured to communicate directly or indirectly with the remote devices. For example, the communication circuit 140 may be configured to communicate via a variety of wireless standards including, but not limited to, Bluetooth®, Bluetooth® Low Energy (BLE) connection, LoRa®, SigFox®, and various standards that may be developed in the future.

The mobile device 60 may further include a sound signal processing circuit 142 for processing audio signals transmitted by and received from the communication circuit 140. Coupled to the sound processing circuit 142 are the microphone 74 and the speaker 76 that enable a user to listen and speak via the mobile device 60. The communication circuit 140 and sound processing circuit 142 are each coupled to a control circuit 130 so as to carry out the overall operation of the mobile device 60. Audio data may be passed from the control circuit 130 to the sound signal processing circuit 142 for playback to the user. The audio data may include, for example, audio data from an audio file stored in the memory 134 and retrieved by the control circuit 130, or received audio data such as in the form of audio data from a remote server. The sound processing circuit 142 may include any appropriate buffers, decoders, amplifiers, etc.

The mobile device 60 may comprise the display 38 coupled to the control circuit 130 by a video processing circuit 148 that converts video data to a video signal used to drive the display device 10. The video processing circuit 148 may include any appropriate buffers, decoders, video data processors, etc. The video data may be generated by the control circuit 130, retrieved from a video file that is stored in the memory 134, derived from an incoming video data stream received by the communication circuit 140 from the remote server or obtained by any other suitable method. The mobile device 60 may further comprise a user interface 70 or keypad in communication with the control circuit 130. The user interface 70 may further function in connection with the display device 10 to provide for a touchscreen user interface configuration.

The mobile device 60 may further include one or more I/O interfaces 150. The I/O interfaces 150 may be in the form of typical mobile telephone I/O interfaces and may include one or more electrical connectors. As is typical, the I/O interfaces 150 may be used to couple the mobile device 60 to a battery charger to charge a battery of a power supply 152 within the mobile device 60. Further, the I/O interfaces 150 may serve to connect the mobile device 60 to a personal computer or other devices via a data cable for the exchange of data. The data exchanged may include image data for identifying a vehicle accessory. The mobile device 60 may receive operating power via the I/O interfaces 150 when connected to a power adapter.

The control circuit 130 may comprise one or more timers for carrying out timing functions. The mobile device 60 also may include a position data receiver 154, such as a global positioning system (GPS) receiver. The mobile device 60 also may include a network adapter 156, such as an infrared transceiver and/or a radio frequency (RF) adapter or transceiver (e.g., a Bluetooth® adapter or transceiver).

The mobile device 60 may further be coupled to a camera system 158 including a controller 160, such as a digital signal processor (DSP). The functions of the controller 160 may be controlled by the control circuit 130. The camera system 158 may further include the image sensor 16 (e.g., a charge-coupled device or CCD) to image a field of view as determined by imaging optics 161 of the camera system 158. A light meter 162 may detect illumination conditions in the field of view and the at least one light source 18, which may correspond to a flash to provide supplemental illumination during the capture of image data.

It will be appreciated that embodiments of the invention described herein may be comprised of one or more conventional processors and unique stored program instructions that control one or more processors to implement, in conjunction with certain non-processor circuits, some, most, or all of the functions of a display assembly 8, as described herein. The non-processor circuits may include, but are not limited to, signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It will be understood by one having ordinary skill in the art that construction of the described invention and other components is not limited to any specific material. Other exemplary embodiments of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A display apparatus for a vehicle comprising:
   a display device comprising a plurality of display elements forming a display surface having a display perimeter disposed in a housing and configured to display image data in a display emission;
   an electrochromic element abutting the display device and configured to selectively transmit the display emission therethrough; and
   an imager module disposed on the display surface, the imager module comprising:

an image sensor configured to capture image data in a field of view directed through the electrochromic element; and
a light source configured to transmit an emission through the electrochromic element, wherein the image sensor is configured to capture image data comprising reflected light from the emission through the electrochromic element; and
wherein the display elements comprise a pixel array extending to the perimeter of the display and wherein a plurality of pixels of the pixel array form an opening on the display surface in which the imager module and the light source are located, and wherein the pixels of the pixel array surround the image sensor and the light source on the display surface.

2. The display apparatus according to claim 1, wherein the object corresponds to an eye of an occupant of the vehicle.

3. The display apparatus according to claim 1, wherein the light source is configured to emit light in a near-infrared (NIR) range.

4. The display apparatus according to claim 1, further comprising a controller in communication with the display and the imager module, wherein the controller is configured to:
process the image data;
identify the object in the image data; and
display the object on a portion of the display device.

5. The display apparatus according to claim 4, wherein the controller is further configured to:
communicate an authorization signal to a vehicle control module to control one or more vehicle functions based on the identification of the object.

6. The display apparatus according to claim 1, wherein the display apparatus is implemented as a rearview display device operable to display a rearward directed field of view from the vehicle.

7. The display apparatus according to claim 1, wherein the electrochromic element comprises:
a first substrate comprising a first surface and a second surface;
a second substrate comprising a third surface and a fourth surface, wherein the first substrate and the second substrate form a cavity; and
an electrochromic medium contained in the cavity.

8. The scanning display according to claim 7, wherein the image sensor is positioned adjacent to the fourth surface and the field of view is directed outward through the first surface.

9. A display apparatus for a vehicle comprising:
a display device comprising a plurality of display elements forming a display surface having a display perimeter disposed in a housing and configured to display image data in a display emission, wherein the plurality of display elements comprise a pixel array comprising a plurality of pixels arranged in rows and columns;
an electrochromic element abutting the display device and configured to selectively transmit the display emission therethrough; and
an image sensor configured to capture image data comprising an object in a field of view directed through the electrochromic element, wherein the display elements form an opening and surround the image sensor on the display surface such that the image sensor is disposed within the display perimeter, wherein the opening is formed by omitting at least one of the display elements in the pixel array.

10. The display apparatus according to claim 9, wherein the pixels comprise a plurality of red pixels, green pixels, and blue pixels arranged in sequence in the rows and columns.

11. The display apparatus according to claim 10, wherein the image sensor is positioned in an opening formed by omitting one or more of the red, green, or blue pixels from the display surface.

12. The display apparatus according to claim 11, wherein the image sensor is surrounded by at least one of the rows or columns of pixels on the display surface.

13. The display apparatus according to claim 9, wherein the pixel array forms a contiguous display region comprising a display perimeter.

14. The display apparatus according to claim 13, wherein a portion of the pixel array forms an opening in the contiguous display region, wherein the pixels are omitted from the opening.

15. The display apparatus according to claim 14, wherein the image sensor is positioned in the opening on the display surface and surrounded by the pixels of the pixel array on the display surface.

16. A vehicle display device comprising:
an image sensor comprising an imager configured to capture image data;
at least one light source in communication with the image sensor, wherein the image sensor and the at least one light source are disposed within a sensor perimeter formed on a display surface of the vehicle display device; and
a display comprising a plurality of display elements forming the display surface having a display perimeter, wherein the display elements form an opening containing the sensor perimeter and surround the sensor perimeter on the display surface such that the image sensor and the light source are disposed within the display perimeter, wherein the display elements form the opening in the display surface and the opening conforms to and surrounds the sensor perimeter.

17. The device according to claim 16, further comprising:
an electrochromic element comprising:
a first substrate comprising a first surface and a second surface;
a second substrate comprising a third surface and a fourth surface, wherein the first substrate and the second substrate form a cavity; and
an electrochromic medium contained in the cavity; and
wherein the image sensor is directed toward the fourth surface and configured to capture the image data of an object through the electrochromic element.

18. The display apparatus according to claim 1, wherein a plurality of pixels of the pixel array form a contiguous display surface interrupted by the opening wherein the pixels are omitted.

* * * * *